(12) United States Patent
Ji et al.

(10) Patent No.: US 12,094,077 B2
(45) Date of Patent: Sep. 17, 2024

(54) METHOD AND APPARATUS FOR PROCESSING IMAGE, ELECTRONIC DEVICE, AND STORAGE MEDIUM

(71) Applicant: AMLOGIC (SHANGHAI) CO., LTD., Shanghai (CN)

(72) Inventors: Ping Ji, Shanghai (CN); Tao Ji, Shanghai (CN); Chun Wang, Shanghai (CN); Dongjian Wang, Shanghai (CN); Xuyun Chen, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 544 days.

(21) Appl. No.: 17/305,873

(22) Filed: Jul. 16, 2021

(65) Prior Publication Data
US 2022/0028035 A1 Jan. 27, 2022

(30) Foreign Application Priority Data

Jul. 21, 2020 (CN) .......................... 202010705370.0

(51) Int. Cl.
*H04N 19/182* (2014.01)
*G06T 3/4007* (2024.01)
(Continued)

(52) U.S. Cl.
CPC .......... *G06T 3/4007* (2013.01); *H04N 19/132* (2014.11); *H04N 19/182* (2014.11); *H04N 19/46* (2014.11); *H04N 19/513* (2014.11)

(58) Field of Classification Search
CPC .. G06T 3/4007; H04N 19/132; H04N 19/182; H04N 19/46; H04N 19/513; H04N 19/17; H04N 19/59; H04N 19/51; H04N 19/139
(Continued)

(56) References Cited

U.S. PATENT DOCUMENTS

2006/0023119 A1\* 2/2006 Han ....................... H04N 5/145
348/452
2011/0261264 A1 10/2011 Zafarifar et al.

FOREIGN PATENT DOCUMENTS

CN 105282475 1/2016
CN 107666560 2/2018

OTHER PUBLICATIONS

Extended European Search Report from related Application No. 21186675.1 mailed Jan. 4, 2022.
(Continued)

*Primary Examiner* — Sheela C Chawan
(74) *Attorney, Agent, or Firm* — Grossman, Tucker, Perreault & Pfleger, PLLC

(57) ABSTRACT

A method for processing an image, an apparatus for processing an image, an electronic device, and a storage medium. The method includes: obtaining a first aim-to-mask flag of a pixel to be interpolated; obtaining second aim-to-mask flags of pixels in a preset neighborhood of the pixel to be interpolated; determining flag categories and a number corresponding to each of the flag categories, in the first aim-to-mask flag and the second aim-to-mask flags; obtaining a third aim-to-mask flag of the pixel to be interpolated based on the flag categories and the number corresponding to each of the flag categories; obtaining interpolation data of the pixel to be interpolated based on the third aim-to-mask flag of the pixel to be interpolated; and performing motion compensation on the pixel to be interpolated based on the interpolation data.

17 Claims, 3 Drawing Sheets

(51) Int. Cl.
*H04N 19/132* (2014.01)
*H04N 19/46* (2014.01)
*H04N 19/513* (2014.01)

(58) Field of Classification Search
USPC ........................................................ 382/100
See application file for complete search history.

(56) References Cited

OTHER PUBLICATIONS

Office Action from related Application No. 21186675.1 mailed Mar. 20, 2024.

* cited by examiner

METHOD AND APPARATUS FOR PROCESSING IMAGE, ELECTRONIC DEVICE, AND STORAGE MEDIUM

CROSS-REFERENCE TO RELATED APPLICATION

This application is based on and claims priority to Chinese Patent Application No. 202010705370.0 filed on 21 Jul. 2020, the content of which is hereby incorporated by reference in its entirety into this disclosure.

FIELD

The disclosure relates to the field of image processing technologies, and more particularly to a method for processing an image, an apparatus for processing an image, an electronic device, and a storage medium.

BACKGROUND

A mask may be an object that is static for a duration in a video stream, such as a television station logo, lines, subtitles. Whether the object is the mask depends on edge detection information and distribution information of motion vectors.

SUMMARY

A method for processing an image is provided according to a first aspect of the disclosure. The method includes: obtaining a first aim-to-mask flag of a pixel to be interpolated; obtaining second aim-to-mask flags of pixels in a preset neighborhood of the pixel to be interpolated; determining flag categories and a number corresponding to each of the flag categories, in the first aim-to-mask flag and the second aim-to-mask flags; obtaining a third aim-to-mask flag of the pixel to be interpolated based on the flag categories and the number corresponding to each of the flag categories; obtaining interpolation data of the pixel to be interpolated based on the third aim-to-mask flag of the pixel to be interpolated; and performing motion compensation on the pixel to be interpolated based on the interpolation data.

A non-transitory computer-readable storage medium is provided according to a second aspect of the disclosure. The non-transitory computer-readable storage medium has stored therein a computer program. When the computer program is executed, the method for processing the image may be performed. An apparatus for processing an image is provided according to a third aspect of the disclosure. The apparatus includes a processor; and a memory communicatively coupled to the processor. The memory is configured to store a computer program executable by the processor. The processor is configured to execute the computer program to perform the method for processing the image.

An electronic device is provided according to a fourth aspect of the disclosure. The electronic device includes an apparatus for displaying an image and the apparatus for processing the image. The apparatus for displaying the image is coupled to the apparatus for processing the image.

Additional aspects and advantages of the disclosure will be given in part in the following descriptions, become apparent in part from the following descriptions, or be learned from the practice of the disclosure.

BRIEF DESCRIPTION OF THE DRAWINGS

The described above and/or additional aspects and advantages of the disclosure will become apparent and more readily appreciated, from the following descriptions for embodiments made with reference to the drawings.

DETAILED DESCRIPTION

Reference will be made in detail to the embodiments of the disclosure. The embodiments described herein with reference to the drawings are exemplary. The embodiments of the disclosure will be described in detail below.

In image processing technologies, motion compensation is a manner of describing a difference between adjacent images in the video stream. In detail, it describes, in the video stream, how each pixel block in a previous image moves to a certain position in a current image. This manner is often used by video compression/video codecs to reduce spatial redundancy in video sequences. It may also be used for operations such as deinterlacing and motion interpolation.

It is difficult to obtain motion vectors in gaps among masks adjacent with each other when performing the motion compensation. For the motion compensation in the gaps among the masks, data in zero-vector positions may be used. Also, unilateral data or bilateral fusion data may be used. As a result, interpolation data obtained in the gaps among the masks may be irregular, and the gaps among the masks in the final image may show an unclean feeling for people, which reduces a visual effect of the final video.

There may be some problems in the mask detection during the image processing. For example, the mask itself looks broken because the mask is protected incompletely. For another example, correct image content in the video sequence is mistakenly detected as the mask, causing a mistake in the mask detection. For another example, when performing the motion compensation, the interpolation data in the gaps of the masks is irregular, causing the gaps of the masks to appear unclean. These problems may reduce the quality of the finally-displayed video image to a certain extent.

Under a case that there is no broken in the mask or the mistake in the mask detection, when performing motion estimate and motion compensation (MEMC), the problem of uncleanness in the gaps of the masks may be caused during interpolation calculation. Therefore, some embodiments of the disclosure proposes a method for processing an image. The method may alleviate the problem of uncleanness in the gaps of the masks, so that the video stream processed by MEMC makes human eyes feel more comfortable in the final play effect.

Figure 1:
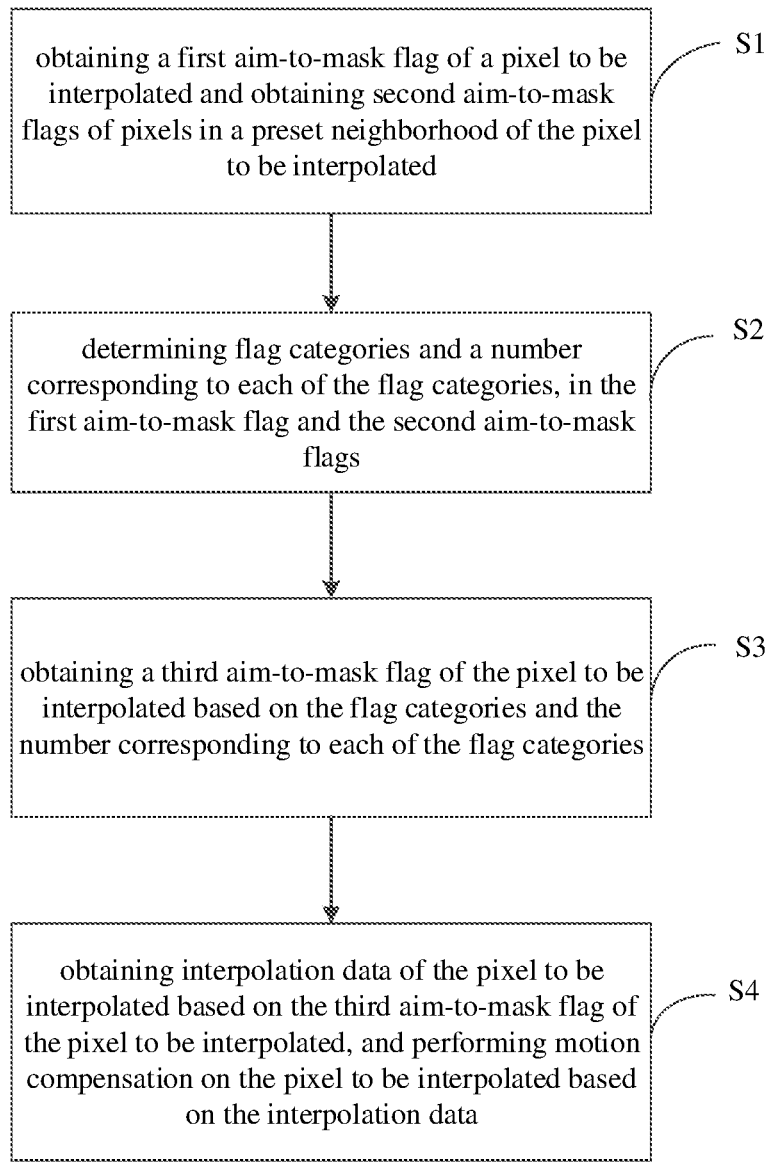
FIG. 1 is a flow chart illustrating a method for processing an image according to some embodiments of the disclosure.
Figure 2:
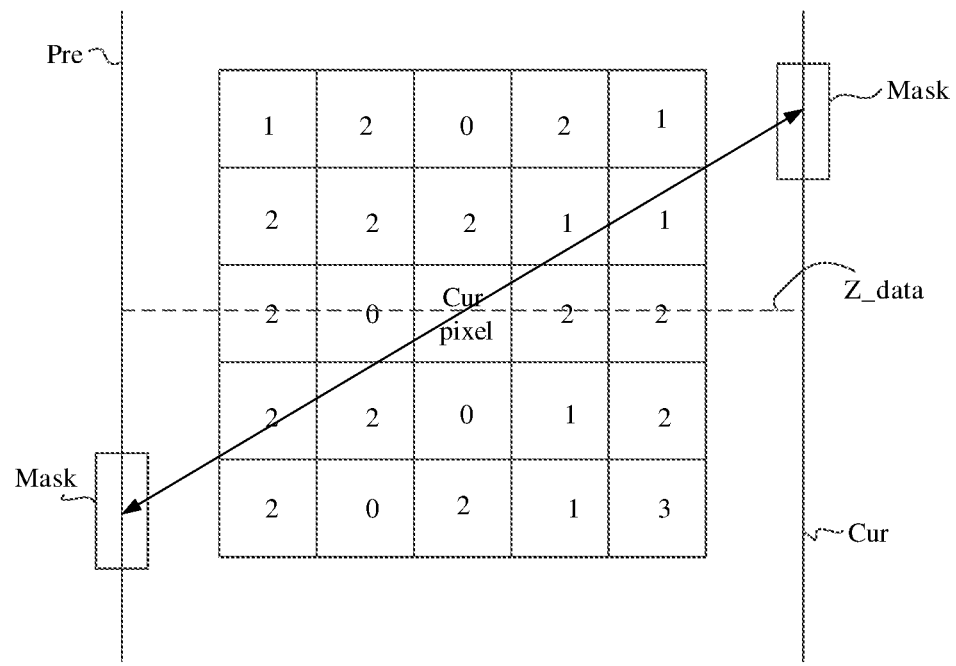
FIG. 2 is a schematic diagram illustrating determining a third aim-to-mask flag of a pixel to be interpolated according to some embodiments of the disclosure.
Figure 3:
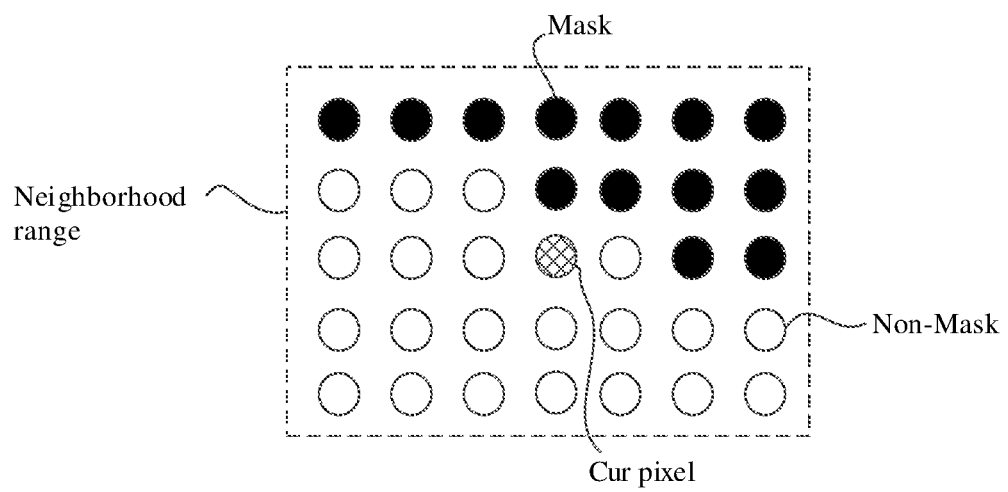
FIG. 3 is a schematic diagram illustrating feathering a result of a motion compensation of a pixel to be interpolated according to some embodiments of the disclosure.

The following describes a method for processing an image according to some embodiments of the disclosure with reference to FIGS. 1 to 3.

FIG. 1 is a flow chart illustrating a method for processing an image according to some embodiments of the disclosure.

As illustrated in FIG. 1, the method in some embodiments of the disclosure at least includes actions in blocks S1-S4 as follows.

In block S1, a first ATM flag of a pixel to be interpolated is obtained, and second ATM flags of pixels in a preset neighborhood of the pixel to be interpolated are obtained.

In some embodiments, each pixel to be interpolated may obtain its ATM flag based on corresponding positions of the previous image and the current image according to motion vectors. The ATM flag of the pixel may indicate that the motion vector of the corresponding position in the previous image aims to the background image or the mask, or indicates whether the motion vector of the pixel in the current image aims to the background image or the mask.

In some embodiments, different categories of ATM flags may be defined based on the directivities of the motion vector of the corresponding position of the pixel to be interpolated in the previous image and the motion vector of the corresponding position of the pixel to be interpolated in the current image. For example, there may be four categories of ATM flags as follows.

ATM flag=0, which means that the motion vector corresponding to the pixel to be interpolated in the previous image and the motion vector corresponding to the pixel to be interpolated in the current image both aim to the normal background image.

ATM flag=1, which means that one of the motion vector corresponding to the pixel to be interpolated in the previous image and the motion vector corresponding to the pixel to be interpolated in the current image aims to the mask region, and another of the motion vector corresponding to the pixel to be interpolated in the previous image and the motion vector corresponding to the pixel to be interpolated in the current image aims to the normal background image.

ATM flag=2, which means that the motion vector corresponding to the pixel to be interpolated in the previous image and the motion vector corresponding to the pixel to be interpolated in the current image both aimed to the mask region.

ATM flag=3, which means that the pixel to be interpolated is the mask.

The above gives examples of four categories of ATM flags only. The meaning of each category may be classified and defined as required.

In some embodiments, it is assumed that the mask detection has been performed on the video stream, and an initial ATM flag of each pixel is obtained. To solve the problem of uncleanness in the gaps of the masks caused during the interpolation, ATM flags around the pixel to be interpolated, for example, in the NxM neighborhood (including the pixel to be interpolated), may be used as the reference set. The new ATM flag, i.e., the third ATM flag, of the pixel to be interpolated may be generated by the aggregate voting strategy. The detail may be referred to actions in blocks S2 and S3.

In block S2, flag categories and a number corresponding to each of the flag categories, in the first ATM flag and the second ATM flags, are determined.

Since motion vectors around the pixel to be interpolated such as in the preset neighborhood are difficult to be accurate and have poor consistency, if the motion compensation interpolation is directly performed based on the ATM flag of the pixel to be interpolated, the data of the compensation region around the mask may be confusing. Part of the data interpolation is visually very abrupt, which is the direct cause of the uncleanness in the mask region. Therefore, in some embodiments of the disclosure, the ATM flags of the pixels in the preset neighborhood of the pixel to be interpolated may be used as the reference set. The categories of flags such as the four categories mentioned above may be counted and the number of the corresponding each category may also be counted. For example, the number of flags that appear in flag=1 or flag=2 or flag=3 or flag=0, may be counted. Furthermore, the interpolation data of the selected pixel to be interpolated may be determined based on the counting result.

In block S3, a third ATM flag of the pixel to be interpolated is obtained based on the flag categories and the number corresponding to each of the flag categories.

In some embodiment, if the ATM flag indicates that the pixel to be interpolated is the mask, this ATM flag is meaningless. When determining the new ATM flag of the pixel to be interpolated, this ATM flag is removed.

In detail, an ATM flag aiming to a mask is removed from the flag categories; a flag category with a largest number among the flag categories is determined; and the flag category with the largest number is used as the third ATM flag of the pixel to be interpolated.

For example, FIG. 2 is a schematic diagram illustrating determining a third ATM flag of a pixel to be interpolated according to some embodiments of the disclosure. As illustrated in FIG. 2, Pre represents the previous image, and Cur represents the current image. The grid P between Pre and Cur represents the interpolation frame between Pre and Cur. Z_data represents the zero vector. Mask represents the mask. Cur pixel represents the pixel to be interpolated. The grid P shows the ATM flags of the pixel to-be-interpolated and the pixels in the neighborhood NxM (N=M=5 in FIG. 2). The categories of the ATM flags in the grid, such as the aforementioned flag=0, flag=1, flag=2, and flag=3, may be counted, and the number of each category may also be counted. Flag=3 is meaningless and is eliminated. The number of flag=2 is the largest, and the ATM flag of the pixel to be interpolated is updated to flag=2. That is, the ATM flags in the pixel to be interpolated and the pixels in the surrounding neighborhood of the pixel to be interpolated are voting. The category with the most number of votes may determine the final new ATM flag of the pixel to be interpolated.

Through the above method, the third ATM flag of the pixel to be interpolated is determined, which may make the ATM flags in the masks more consistent, optimize the problem of ATM flag confusion caused by the motion vectors, and improve the visual effect after motion estimate and motion compensation on the video image. However, there may be the phenomenon of unevenness among different ATM flag regions, which may cause the obvious sawtooth phenomenon at the boundaries of different regions. For this, the method in some embodiments of the disclosure performs motion optimization compensation, that is, the action in block S4 is performed.

In block S4, interpolation data of the pixel to be interpolated is obtained based on the third ATM flag of the pixel to be interpolated, and motion compensation is performed on the pixel to be interpolated based on the interpolation data.

In some embodiments, the interpolation data of the pixel to be interpolated may be selected based on the directivity of the motion vector in the previous image and the directivity of the motion vector in the corresponding position in the current image. That is, the interpolation data of the pixel to be interpolated is obtained based on the third ATM flag of the pixel to be interpolated.

For example, if the third ATM flag is a first-category flag, the interpolation data of the position corresponding to the pixel to be interpolated is obtained based on a first motion vector corresponding to the pixel to be interpolated in a current image and a second motion vector of the position corresponding to the pixel to be interpolated in a previous image. The first-category flag is that the first motion vector and the second motion vector both aim to a background image. For example, ATM flag=0 mentioned above. The normal motion compensation is performed at this time. For example, the average value of the pixel value of the corresponding position in the previous image and the pixel value of the corresponding position in the current image is taken as the interpolation value of the pixel to be interpolated.

For another example, the third ATM flag is a second-category flag. The second-category flag is that one of a first motion vector and a second motion vector aims to a background image and another one of the first motion vector and the second motion vector aims to a mask, in which the first motion vector is a motion vector corresponding to the pixel to be interpolated in a current image, and the second motion vector is a motion vector corresponding to the pixel to be interpolated in a previous image. The motion vector aiming to the background image is used as the interpolation data of the pixel to be interpolated. For example, ATM flag=1, that is, the one-sided motion vector of the pixel to be interpolated aims to the mask and the other-side motion vector aims to the normal background image. The pixel value aiming to the normal background image is selected as the interpolation data of the pixel to be interpolated.

For another example, the third ATM flag is a third-category flag. The third-category flag is that a first motion vector and a second motion vector both aim to a mask, in which the first motion vector is a motion vector corresponding to the pixel to be interpolated in a current image, and the second motion vector is a motion vector corresponding to the pixel to be interpolated in a previous image. A zero vector is used as the interpolation data of the pixel to be interpolated. That is, both sides of the pixel to be interpolated aim to the mask such as ATM flag=2. As illustrated in FIG. 2, at this time, the pixel to be interpolated selects the zero vector as the interpolation data.

For another example, the third ATM flag is a fourth-category flag, in which the fourth-category flag is that the pixel to be interpolated is the mask A zero vector is used as the interpolation data of the pixel to be interpolated.

In short, when performing motion optimization compensation on the pixel to be interpolated based on the third ATM flag, the main principle is that: if the pixel to be interpolated is the mask, that is, ATM flag=3 or ATM flag=2, two zero vectors may be directly selected for interpolation; if the ATM flag of the pixel to be interpolated is 1, the data aiming to the normal background image is selected for interpolation; if the ATM flag of the pixel to be interpolated is 0, bilateral interpolation may be performed normally.

Through the motion optimization compensation in the above embodiments, it is possible to avoid hollows in the mask region, and avoid pixels of the mask itself going into the background to present the phenomenon of the mask flying out, which solves the problem that the image among the masks is visually unclean due to the messy compensation data.

Furthermore, the boundaries of the mask in the real video stream may not be perfect. If it sticks to the mask, it may also cause the phenomenon of incomplete protection on the mask and cause the abnormal points in the mask flying out. Therefore, to avoid the mask flying out, excessive protection on the mask may be caused, and some pixels in the background image on the top, bottom, left, and right of the mask may also be protected, resulting in the halo phenomenon of the mask. In addition to the pixel to be interpolated being the mask, as mentioned above, since the ATM flag of the pixel to be interpolated has been updated, the consistency of ATM flags among the mask may be improved, but it also brings that the boundaries of the interpolation region and other ATM flag interpolation regions are not smooth when the ATM flag is 0, and there is a saw-tooth phenomenon visually.

To solve the above further problems, the motion estimate and motion compensation in some embodiments of the disclosure also feathers the result after the motion compensation on the pixel to be interpolated. Therefore, the boundary transition of different ATM flag regions is more gentle and smooth, reducing the visual saw-tooth phenomenon.

In some embodiments, when feathering the result after the motion compensation on the pixel to be interpolated, a number of pixels using the zero vector as the interpolation data in the pixel to be interpolated and the pixels in the preset neighborhood such as the NxM neighborhood may be counted, that is, the number of pixels with ATM Flag=2 and pixels with ATM Flag=3; a weight coefficient is generated based on the number of pixels using the zero vector as the interpolation data and a total number of the pixels in the preset neighborhood; and the result after the motion compensation on the pixel to be interpolated is fused with pixel values of the pixels using the zero vector as the interpolation data based on the weight coefficient.

For example, FIG. 3 is a schematic diagram illustrating feathering a result of a motion compensation of a pixel to be interpolated according to some embodiments of the disclosure. As illustrated in FIG. 3, Mask represents a mask point, and Cur pixel represents a pixel to be interpolated. The number of pixels belonging to ATM flag=2 and ATM flag=3 in the neighborhood of the pixel to be interpolated such as Mask points may be counted. The weight coefficient of the pixels belonging to ATM flag=2 and ATM flag=3 may be obtained based on the counted number and the total number of the pixels in the neighborhood. The actual interpolation result of the current pixel to be interpolated is fused with the pixel values of the positions in the neighborhood where the zero vector interpolation is used based on the weight coefficient, which may make the region boundary transition with the feathering to reach the soft and unsmooth effect.

It may be seen that, as illustrated in FIG. 3, the pixels that are farther away from the region belonging to ATM Flag=2 and ATM Flag=3 still use the interpolation data determined above for interpolation. As there are more and more mask pixels in the neighborhood of the pixels to be interpolated, the weight of zero vector interpolation is getting larger and larger, so as to achieve the effect of transition.

In summary, with the method for processing the image provided in some embodiments of the disclosure, regarding the problem of unclean visual perception among masks due to the excessive confusion of ATM flags, some embodiments of the disclosure updates the ATM flag of the pixel to be interpolated based on the distribution of the ATM flags in the neighborhood of the pixel to be interpolated, so that the ATM flag of the pixel to be interpolated towards likely the majority. Therefore, the consistency of the ATM flags in the neighborhood may be improved. The image quality in the region among the masks may be improved. The interpolation data may be obtained based on the updated third aim-to-mask flag of the pixel to be interpolated to perform the motion compensation. The phenomenon of the mask flying out the video image may be avoided. The result after the motion compensation on the pixel to be interpolated may be featured. The saw-tooth and halo phenomenon of the boundaries of the mask may be improved.

According to a second aspect of embodiments of the disclosure, a non-transitory computer-readable storage medium is provided. The non-transitory computer-readable storage medium has stored therein a computer program. When the computer program is executed, the above method for processing the image may be performed.

Figure 4:
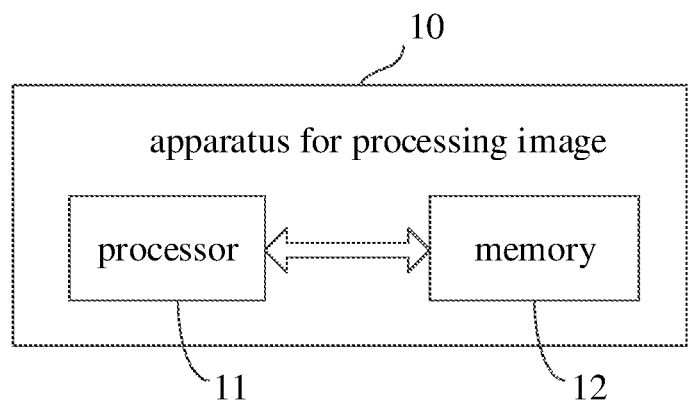
FIG. 4 is a block diagram illustrating an apparatus for processing an image according to some embodiments of the disclosure.

According to a third aspect of embodiments of the disclosure, an apparatus for processing an image is provided. FIG. 4 is a block diagram illustrating an apparatus for processing an image according to some embodiments of the disclosure. As illustrated in FIG. 4, the apparatus 10 includes a processor 11 and a memory 12 communicatively coupled to the processor 11. The memory 12 is configured to store a computer program executable by the processor 11. The processor 11 is configured to execute the computer program to perform the above method for processing the image.

The above-mentioned logic instructions in the memory 12 may be implemented in the form of software functional units and when sold or used as independent products, which may be stored in a computer-readable storage medium.

The memory 12, as the computer-readable storage medium, may be used to store software programs and computer-executable programs, such as program instructions/modules corresponding to the methods in the embodiments of the disclosure. The processor 11 executes functional applications and data processing by running software programs, instructions, and modules stored in the memory 12, that is, implements the method in the foregoing method embodiments.

The memory 12 may include a program storage area and a data storage area. The program storage area may store an operating system and an application program required by at least one function. The data storage area may store data created according to the use of the terminal device. In addition, the memory 12 may include a high-speed random access memory, and may also include a non-volatile memory.

The technical solution of the embodiments of the disclosure may be embodied in the form of a software product. The software product is stored in a storage medium and includes one or more instructions to make a computer device or image processing device execute all or part of actions in the method described in the embodiments of the disclosure. The aforementioned storage medium may be a non-transitory storage medium that can store program codes, for example, including: a U disk, a mobile hard disk, a read-only memory (ROM), a random access memory (RAM), a magnetic disk or an optical disk, etc., and also be a transient storage medium.

An electronic device is provided according to a fourth aspect of embodiment of the disclosure. In some embodiments, the electronic device may include some devices including image processing and image displaying, such as a TV set and a projector.

Figure 5:
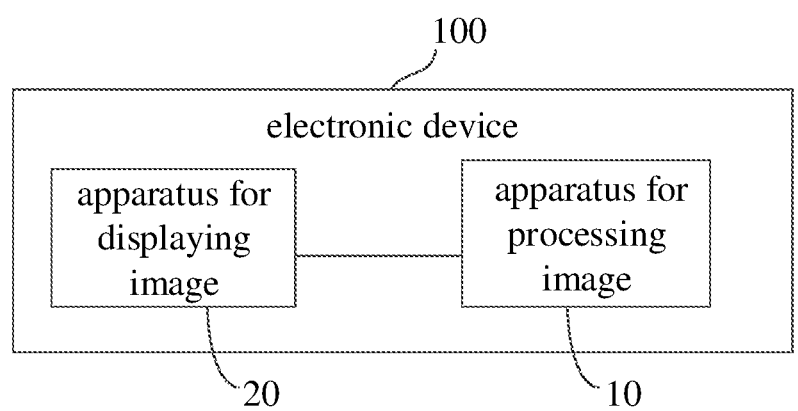
FIG. 5 is a block diagram illustrating an electronic device according to some embodiments of the disclosure.

As illustrated in FIG. 5, the electronic device 100 in some embodiments of the disclosure includes an apparatus 20 for displaying an image and the apparatus 10 for processing the image in the above embodiments. The apparatus 20 for displaying the image is coupled to the apparatus 10 for processing the image. The apparatus 10 for processing the image may process video images that needs to be displayed. In detail, the apparatus 10 for processing the image may execute the method for processing the image in the above embodiments, and transmit the processed video images to the apparatus 20 for displaying the image in frames. The apparatus 20 for displaying the image is used to display the video images.

The electronic device 100 in the embodiments of the disclosure adopts the apparatus 10 for processing the image in the above embodiments. The apparatus 10 for processing the image determines the new ATM flag of the pixel to be interpolated, i.e., the third aim-to-mask flag, based on the distribution of the ATM flags in the neighborhood of the pixel to be interpolated. Therefore, the consistency of the ATM flags may be improved. The phenomenon of uncleanness in the gaps of the masks may be avoided. The interpolation data may be obtained based on the third aim-to-mask flag of the pixel to be interpolated to perform the motion compensation. The phenomenon of the mask flying out may be avoided and the quality of the final video image displayed by the apparatus 20 for processing the image may be improved.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the disclosure, and changes, alternatives, and modifications can be made in the embodiments without departing from spirit, principles and scope of the disclosure.

What is claimed is:

1. A method for processing an image, comprising:
obtaining, based on a motion vector of a corresponding position of a pixel to be interpolated in a previous image and a motion vector of a corresponding position of the pixel to be interpolated in a current image, a first aim-to-mask flag of the pixel to be interpolated, the mask being an object that is static for a duration in a video stream, the first aim-to-mask flag of the pixel to be interpolated indicating that the motion vector of the corresponding position of the pixel to be interpolated in the previous image aims to a background image or a mask, and indicating that the motion vector of the corresponding position of the pixel to be interpolated in the current image aims to a background image or a mask;

obtaining second aim-to-mask flags of pixels in a preset neighborhood of the pixel to be interpolated, the second aim-to-mask flag of the pixel in the preset neighborhood indicating that the motion vector of the corresponding position of the pixel in the previous image aims to a background image or a mask, and indicating that the motion vector of the corresponding position of the pixel in the current image aims to a background image or a mask;

determining flag categories and a number of pixels of each of the flag categories, in the first aim-to-mask flag and the second aim-to-mask flags, the flag category being defined based on directivity of a motion vector of a corresponding position of a corresponding pixel in a previous image and directivity of a motion vector of a corresponding position of the corresponding pixel in a current image, combinations of directivity of the motion vector of the corresponding position of the corresponding pixel in the previous image and directivity of the motion vector of the corresponding position of the corresponding pixel in the current image are different among different flag categories;

obtaining a third aim-to-mask flag of the pixel to be interpolated based on the flag categories and the number of pixels of to each of the flag categories, comprising:

removing an aim-to-mask flag aiming to a mask from the flag categories;

determining a flag category with a largest number among the flag categories;

using the flag category with the largest number as a third aim-to-mask flag of the pixel to be interpolated; and updating the first aim-to-mask flag of the pixel to be interpolated to the third aim-to-mask flag;

obtaining interpolation data of the pixel to be interpolated based on the third aim-to-mask flag of the pixel to be interpolated; and performing motion compensation on the pixel to be interpolated based on the interpolation data.

2. The method as claimed in claim 1, wherein obtaining the interpolation data of the pixel to be interpolated based on the third aim-to-mask flag of the pixel to be interpolated comprises:

under a case that the third aim-to-mask flag is a first-category flag, obtaining the interpolation data of the pixel to be interpolated based on a first motion vector corresponding to the pixel to be interpolated in a current image and a second motion vector corresponding to the pixel to be interpolated in a previous image;

wherein, the first-category flag is that the first motion vector and the second motion vector both aim to a background image.

3. The method as claimed in claim 1, wherein obtaining the interpolation data of the pixel to be interpolated based on the third aim-to-mask flag of the pixel to be interpolated comprises:

under a case that the third aim-to-mask flag is a second-category flag, using a motion vector aiming to a background image as the interpolation data of the pixel to be interpolated;

wherein the second-category flag is that one of a first motion vector and a second motion vector aims to the background image and another of the first motion vector and the second motion vector aims to a mask, the first motion vector is a motion vector corresponding to the pixel to be interpolated in a current image, and the second motion vector is a motion vector corresponding to the pixel to be interpolated in a previous image.

4. The method as claimed in claim 1, wherein obtaining the interpolation data of the pixel to be interpolated based on the third aim-to-mask flag of the pixel to be interpolated comprises:

under a case that the third aim-to-mask flag is a third-category flag, using a zero vector as the interpolation data of the pixel to be interpolated;

wherein the third-category flag is that a first motion vector and a second motion vector both aim to a mask, the first motion vector is a motion vector corresponding to the pixel to be interpolated in a current image, and the second motion vector is a motion vector corresponding to the pixel to be interpolated in a previous image.

5. The method as claimed in claim 4, further comprising:

feathering a result after the motion compensation on the pixel to be interpolated.

6. The method as claimed in claim 5, wherein feathering the result after the motion compensation on the pixel to be interpolated comprises:

counting a number of pixels using the zero vector as the interpolation data in the pixel to be interpolated and the pixels in the preset neighborhood;

generating a weight coefficient based on the number of pixels using the zero vector as the interpolation data and a total number of the pixels in the preset neighborhood; and fusing the result after the motion compensation on the pixel to be interpolated with pixel values of the pixels using the zero vector as the interpolation data based on the weight coefficient.

7. The method as claimed in claim 1, wherein obtaining the interpolation data of the pixel to be interpolated based on the third aim-to-mask flag of the pixel to be interpolated comprises:

under a case that the third aim-to-mask flag is a fourth-category flag, using a zero vector as the interpolation data of the pixel to be interpolated;

wherein the fourth-category flag is that the pixel to be interpolated is a mask.

8. A non-transitory computer-readable storage medium having stored therein a computer program that, when executed, performs a method for processing an image, the method comprising:

obtaining, based on a motion vector of a corresponding position of a pixel to be interpolated in a previous image and a motion vector of a corresponding position of the pixel to be interpolated in a current image, a first aim-to-mask flag of the pixel to be interpolated, the mask being an object that is static for a duration in a video stream, the first aim-to-mask flag of the pixel to be interpolated indicating that the motion vector of the corresponding position of the pixel to be interpolated in the previous image aims to a background image or a mask, and indicating that the motion vector of the corresponding position of the pixel to be interpolated in the current image aims to a background image or a mask;

obtaining second aim-to-mask flags of pixels in a preset neighborhood of the pixel to be interpolated, the second aim-to-mask flag of the pixel in the preset neighborhood indicating that the motion vector of the corresponding position of the pixel in the previous image aims to a background image or a mask, and indicating that the motion vector of the corresponding position of the pixel in the current image aims to a background image or a mask;

determining flag categories and a number of pixels of each of the flag categories, in the first aim-to-mask flag and the second aim-to-mask flags, the flag category being defined based on directivity of a motion vector of a corresponding position of a corresponding pixel in a previous image and directivity of a motion vector of a corresponding position of the corresponding pixel in a current image, combinations of directivity of the motion vector of the corresponding position of the corresponding pixel in the previous image and directivity of the motion vector of the corresponding position of the corresponding pixel in the current image are different among different flag categories;

obtaining a third aim-to-mask flag of the pixel to be interpolated based on the flag categories and the number of pixels of each of the flag categories, comprising:

removing an aim-to-mask flag aiming to a mask from the flag categories;

determining a flag category with a largest number among the flag categories;

using the flag category with the largest number as a third aim-to-mask flag of the pixel to be interpolated; and updating the first aim-to-mask flag of the pixel to be interpolated to the third aim-to-mask flag;

obtaining interpolation data of the pixel to be interpolated based on the third aim-to-mask flag of the pixel to be interpolated; and performing motion compensation on the pixel to be interpolated based on the interpolation data.

9. The storage medium as claimed in claim 8, wherein obtaining the interpolation data of the pixel to be interpolated based on the third aim-to-mask flag of the pixel to be interpolated comprises:

under a case that the third aim-to-mask flag is a first-category flag, obtaining the interpolation data of the pixel to be interpolated based on a first motion vector corresponding to the pixel to be interpolated in a current image and a second motion vector corresponding to the pixel to be interpolated in a previous image;

wherein, the first-category flag is that the first motion vector and the second motion vector both aim to a background image.

10. The storage medium as claimed in claim 8, wherein obtaining the interpolation data of the pixel to be interpolated based on the third aim-to-mask flag of the pixel to be interpolated comprises:

under a case that the third aim-to-mask flag is a second-category flag, using a motion vector aiming to a background image as the interpolation data of the pixel to be interpolated;

wherein the second-category flag is that one of a first motion vector and a second motion vector aims to the background image and another of the first motion vector and the second motion vector aims to a mask, the first motion vector is a motion vector corresponding to the pixel to be interpolated in a current image, and the second motion vector is a motion vector corresponding to the pixel to be interpolated in a previous image.

11. The storage medium as claimed in claim 8, wherein obtaining the interpolation data of the pixel to be interpolated based on the third aim-to-mask flag of the pixel to be interpolated comprises:

under a case that the third aim-to-mask flag is a third-category flag, using a zero vector as the interpolation data of the pixel to be interpolated;

wherein the third-category flag is that a first motion vector and a second motion vector both aim to a mask, the first motion vector is a motion vector corresponding to the pixel to be interpolated in a current image, and the second motion vector is a motion vector corresponding to the pixel to be interpolated in a previous image.

12. The storage medium as claimed in claim 11, wherein the method further comprises:

feathering a result after the motion compensation on the pixel to be interpolated.

13. The storage medium as claimed in claim 12, wherein feathering the result after the motion compensation on the pixel to be interpolated comprises:

counting a number of pixels using the zero vector as the interpolation data in the pixel to be interpolated and the pixels in the preset neighborhood;

generating a weight coefficient based on the number of pixels using the zero vector as the interpolation data and a total number of the pixels in the preset neighborhood; and fusing the result after the motion compensation on the pixel to be interpolated with pixel values of the pixels using the zero vector as the interpolation data based on the weight coefficient.

14. The storage medium as claimed in claim 8, wherein obtaining the interpolation data of the pixel to be interpolated based on the third aim-to-mask flag of the pixel to be interpolated comprises:

under a case that the third aim-to-mask flag is a fourth-category flag, using a zero vector as the interpolation data of the pixel to be interpolated;

wherein the fourth-category flag is that the pixel to be interpolated is a mask.

15. An apparatus for processing an image, comprising:

a processor;

a memory communicatively coupled to the processor, wherein the memory is configured to store a computer program executable by the processor, and the processor is configured to:

obtain, based on a motion vector of a corresponding position of a pixel to be interpolated in a previous image and a motion vector of a corresponding position of the pixel to be interpolated in a current image, a first aim-to-mask flag of the pixel to be interpolated, the mask being an object that is static for a duration in a video stream, the first aim-to-mask flag of the pixel to be interpolated indicating that the motion vector of the corresponding position of the pixel to be interpolated in the previous image aims to a background image or a mask, and indicating that the motion vector of the corresponding position of the pixel to be interpolated in the current image aims to a background image or a mask;

obtain second aim-to-mask flags of pixels in a preset neighborhood of the pixel to be interpolated, the second aim-to-mask flag of the pixel in the preset neighborhood indicating that the motion vector of the corresponding position of the pixel in the previous image aims to a background image or a mask, and indicating that the motion vector of the corresponding position of the pixel in the current image aims to a background image or a mask;

determine flag categories and a number of pixels of each of the flag categories, in the first aim-to-mask flag and the second aim-to-mask flags, the flag category being defined based on directivity of a motion vector of a corresponding position of a corresponding pixel in a previous image and directivity of a motion vector of a corresponding position of the corresponding pixel in a current image, combinations of directivity of the motion vector of the corresponding position of the corresponding pixel in the previous image and directivity of the motion vector of the corresponding position of the corresponding pixel in the current image are different among different flag categories;

obtain a third aim-to-mask flag of the pixel to be interpolated based on the flag categories and the number of pixels of to each of the flag categories, comprising:
  removing an aim-to-mask flag aiming to a mask from the flag categories;
  determining a flag category with a largest number among the flag categories;
  using the flag category with the largest number as a third aim-to-mask flag of the pixel to be interpolated; and
  updating the first aim-to-mask flag of the pixel to be interpolated to the third aim-to-mask flag;
  obtain interpolation data of the pixel to be interpolated based on the third aim-to-mask flag of the pixel to be interpolated; and
  perform motion compensation on the pixel to be interpolated based on the interpolation data.

16. The apparatus as claimed in claim 15, wherein the processor is configured to:
  under a case that the third aim-to-mask flag is a first-category flag, obtain the interpolation data of the pixel to be interpolated based on a first motion vector corresponding to the pixel to be interpolated in a current image and a second motion vector corresponding to the pixel to be interpolated in a previous image;
  wherein, the first-category flag is that the first motion vector and the second motion vector both aim to a background image.

17. The apparatus as claimed in claim 15, wherein the processor is configured to:
  under a case that the third aim-to-mask flag is a second-category flag, use a motion vector aiming to a background image as the interpolation data of the pixel to be interpolated;
  wherein the second-category flag is that one of a first motion vector and a second motion vector aims to the background image and another of the first motion vector and the second motion vector aims to a mask, the first motion vector is a motion vector corresponding to the pixel to be interpolated in a current image, and the second motion vector is a motion vector corresponding to the pixel to be interpolated in a previous image.

* * * * *